(12) United States Patent
Mei et al.

(10) Patent No.: US 7,048,339 B2
(45) Date of Patent: May 23, 2006

(54) FORCE-LIMITING ENERGY ABSORBER

(75) Inventors: Feng Mei, Ghent (BE); Thomas Beirnaert, Aalter (BE)

(73) Assignee: N.V. Bekaert S.A., Zwevegem (BE)

( * ) Notice: Subject to any disclaimer, the term of this patent is extended or adjusted under 35 U.S.C. 154(b) by 0 days.

(21) Appl. No.: 10/512,485

(22) PCT Filed: Apr. 22, 2003

(86) PCT No.: PCT/EP03/50119

§ 371 (c)(1),
(2), (4) Date: Oct. 26, 2004

(87) PCT Pub. No.: WO03/091596

PCT Pub. Date: Nov. 6, 2003

(65) Prior Publication Data

US 2005/0225158 A1    Oct. 13, 2005

(30) Foreign Application Priority Data

Apr. 26, 2002   (EP)   .................................. 02100422

(51) Int. Cl.
*A62B 35/04*    (2006.01)
*B60R 22/16*    (2006.01)
*B60R 22/12*    (2006.01)

(52) U.S. Cl. ...................... 297/470; 297/471; 297/472; 297/216.1

(58) Field of Classification Search ................ 297/471, 297/472, 216.1, 216.13, 216.14, 216.15, 297/216.16, 470
See application file for complete search history.

(56) References Cited

U.S. PATENT DOCUMENTS

| 3,361,475 | A |   | 1/1968  | Villiers |
|---|---|---|---|---|
| 3,372,773 | A | * | 3/1968  | Russo et al. ............. 297/472 X |
| 3,444,962 | A | * | 5/1969  | Lech ....................... 297/472 X |
| 3,482,872 | A | * | 12/1969 | Chamberlain ............... 297/472 |
| 3,561,690 | A | * | 2/1971  | Muskat .................... 297/472 X |
| 3,704,877 | A |   | 12/1972 | Nunes et al. |
| 3,862,673 | A | * | 1/1975  | Benson ................... 297/471 X |
| 3,889,969 | A | * | 6/1975  | Otani ......................... 297/470 |
| 3,891,271 | A | * | 6/1975  | Fieni .......................... 297/470 |

(Continued)

FOREIGN PATENT DOCUMENTS

DE         2 260 437       6/1974

(Continued)

OTHER PUBLICATIONS

G. Niemann, "Maschinenelemente," Springer Verlag, 1981, XP002211129, pp. 97 and 108-112.

*Primary Examiner*—Rodney B. White
(74) *Attorney, Agent, or Firm*—Foley & Lardner LLP

(57) ABSTRACT

A force-limiting energy absorber comprises at least a first and a second elongated metal element (12, 13), being chosen out of a group consisting of a metal wire, a profiled metal wire, a metal strand, a bundle of untwisted metal wires and a metal rope. The elongated metal elements (12, 13) are deformable in its plastic region of its load-elongation diagram for absorbing energy. The load-elongation diagram and elongation at fracture of the first elongated metal element (12) is different from the load elongation diagram and elongation at fracture of the second elongated metal element (13).

14 Claims, 3 Drawing Sheets

U.S. PATENT DOCUMENTS

| | | | |
|---|---|---|---|
| 3,917,031 A * | 11/1975 | Doin et al. | 297/472 X |
| 3,937,407 A * | 2/1976 | Matsuo | 297/472 X |
| 3,937,487 A * | 2/1976 | Pech | 297/470 |
| 3,957,281 A * | 5/1976 | Pech | 297/470 |
| 3,975,258 A * | 8/1976 | Fox | 297/471 X |
| 3,982,775 A * | 9/1976 | Lindblad | 297/470 X |
| 4,062,994 A * | 12/1977 | Millman et al. | 188/371 X |
| 4,119,344 A * | 10/1978 | Kondo | 297/471 |
| 4,385,775 A * | 5/1983 | Shimogawa et al. | 297/472 X |
| 4,753,772 A | 6/1988 | Schmertz | |
| 4,830,347 A | 5/1989 | Langshaw | |
| 4,904,023 A | 2/1990 | Föhl | |
| 4,948,199 A | 8/1990 | Weller | 297/472 |
| 5,197,698 A | 3/1993 | Bartholomew | |
| 5,303,983 A * | 4/1994 | Gauger et al. | 297/472 |
| 5,507,552 A * | 4/1996 | Ineich et al. | 297/472 X |
| 5,597,205 A * | 1/1997 | Glance et al. | 297/216.1 X |
| 5,833,267 A * | 11/1998 | Cordes et al. | 297/470 X |
| 5,967,442 A | 10/1999 | Wier | |
| 6,092,875 A * | 7/2000 | Pleyer | 297/470 |
| 6,267,314 B1 | 7/2001 | Singer et al. | |
| 6,273,469 B1 * | 8/2001 | Kwaske et al. | 297/472 X |
| 6,312,057 B1 * | 11/2001 | Feile | 297/471 |
| 6,712,394 B1 * | 3/2004 | Betz et al. | 280/805 |
| 6,913,288 B1 * | 7/2005 | Schulz et al. | 280/805 |

FOREIGN PATENT DOCUMENTS

| | | |
|---|---|---|
| DE | 25 02 925 A1 | 7/1975 |
| DE | 199 17 350 A1 | 10/2000 |
| EP | 0 909 684 A2 | 4/1999 |
| EP | 0 715 997 B1 | 4/2000 |
| EP | 0 844 110 B1 | 7/2002 |
| GB | 2 084 691 A | 4/1982 |

* cited by examiner

FORCE-LIMITING ENERGY ABSORBER

FIELD OF THE INVENTION

The present invention relates to a force-limiting energy absorber. The present invention also relates to the use of a force-limiting absorber with a variety of safety devices such as e.g. a safety belt, an anti-whiplash seat, a head cushion, lifelines, safety lines,

BACKGROUND OF THE INVENTION

Force-limiting absorbers or energy management devices or energy-dissipating structures are known in the art.

U.S. Pat. No. 4,904,023 discloses a force-limiting energy absorber, which comprises a series of stretch members lying one behind the other in the direction of the tensile stress.

U.S. Pat. No. B1-6,267,314 discloses a force-limiting energy absorber, which comprises a torsion rod.

EP-A1-0 715 997 discloses a force-limiting energy absorber which comprises a strap with a series of deflectable beams.

SUMMARY OF THE INVENTION

It is an object of the present invention to provide an alternative force-limiting energy absorber.

It is another object of the present invention to provide a force-limiting absorber, which is not expensive to make.

It is a further object of the present invention to provide a force-limiting absorber, which can be tailored according to predetermined features.

It is yet another object of the present invention to provide a force-limiting absorber, which can be easily built in into safety systems.

According to the invention, a force-limiting energy absorber comprises at least a first and a second elongated metal element, being chosen out of a group consisting of a metal wire, a profiled metal wire, a metal strand, a bundle of untwisted metal wires and a metal rope. This first and second elongated metal element is deformable in its plastic region of its load-elongation diagram for absorbing energy. The energy absorber as subject of the invention is characterized in that the load-elongation diagram and elongation at fracture of the first elongated metal element is different from the load-elongation diagram and elongation at fracture of the second elongated metal element.

The elongated metal element is chosen out of a group consisting of a metal wire, a profiled metal wire, a metal strand, a bundle of untwisted metal wires and a metal rope. Radial cross-sections of the wires, used as elongated metal elements as such or used to provide the metal strands, ropes or bundles on their term used as elongated metal elements, are not restrictively being circular, but may also have a profiled shape, e.g. a rectangular or an I-profiled shape. In case of a rectangular cross-section of the elongated metal element, the rectangular cross-section has a first (short) side and a second (long) side which have a ratio short side/long side preferably less than 1/20. The section of an elongated metal element used to provide a force-limiting energy absorber as subject of the invention is preferably in the range of 0.002 mm$^2$ to 700 mm$^2$.

In comparison with a metal rope, a metal strand or a metal cord, a metal wire absorbs more energy per unity of volume metal. So a metal wire is to be preferred above a twisted structure.

Several metal or metal alloys may be used to provide the elongated metal element, such as Al or Al-alloys, Cu or Cu-alloys or Zn or Zn-alloys. Most preferably however steel alloys are used.

Preferably at the first or the second elongated metal element has an irreversible, plastic elongation at fracture above 5%, e.g. above 7%. In a particular embodiment of the invention, the elongated metal element is a low carbon steel wire, i.e. a steel wire with a carbon content below 0.20%, which has been annealed so that it has an elongation at fracture of more than 20%, e.g. more than 30%. After only 1% elongation, 80% of the maximum force has already been reached, after which the force only increased slightly. In other words, this annealed low carbon steel wire has a force-elongation diagram that approaches a constant force in the plastic region.

In case the increase of force is too high in the beginning of the elongation, the first and/or the second elongated metal element may be provided with one or more undulations, waves or crimps, e.g. by plastically deforming them between a pair of toothed wheels, so that structural elongation is introduced into the elongated metal element and so that the initial slope of a load-elongation curve is not that high.

The working of a force-limiting energy absorber according to the invention having a first and a second elongated metal element is described hereinafter.

The first elongated metal element has a first load-elongation diagram and elongation at fracture $\epsilon_1$ and the second elongated metal element has a second load-elongation diagram and elongation at fracture $\epsilon_2$. The first elongation $\epsilon_1$ is smaller than the second elongation $\epsilon_2$. For example $\epsilon_2$ is more than two times $\epsilon_1$.

Such a force-limiting energy absorber allows a two-stage working. In a first phase, immediately following e.g. a collision, the force is greater than in a second phase, following the first phase. In the first phase, the first elongated metal element reach quite quickly their maximum force and keep that level until a maximum elongation $\epsilon_1$, e.g. of 7% or even higher, is reached. At the time the maximum elongation of the first elongated metal element is reached, the first elongated metal element breaks and the second elongated metal element take over and the force falls down to a lower level. The force remains there more or less constant until a much higher elongation $\epsilon_2$, e.g. of about 20% or even 30% or more, has been reached.

As an example, such force-limiting energy absorber may be realized e.g. by using a steel wire, being the second elongated metal element, with a relatively low carbon content, i.e. smaller than 0.20 percent, which has been annealed and which has an elongation $\epsilon_2$ greater than 20%. An other steel wire, being the first elongated metal element, has a relatively higher carbon content, i.e. higher than 0.60 percent, and which may be subjected to a final stress-relieving treatment so that an elongation of about 5% to 7% is obtained.

It is clear that the energy absorber may comprise more than two elongated metal elements. Each of the additional elongated metal elements may have a different load-elongation diagram and elongation at fracture. Possibly some of the additional elongated metal elements may be identical to the first or the second elongated metal element. One may define then sets of elongated metal elements, which are identical to each other.

A skilled man understands that more than two phases can be provided using more than two sets of elongated metal elements, e.g. 2, 3, 4 or even 5 sets of different elongated metal elements.

All elongated metal elements have preferably essentially the same length.

In a particular embodiment of the invention, the elongated metal elements are embedded in a matrix. Several polymers, preferable thermoplastic polymers, may be used as matrix, such as e.g. polyethylene (PE), polypropylene (PP), polystyrene (PS), polyethylene terephthalate (PET), polyethylene napthalate (PEN), polybuteen terephthalate (PBT) polyvinylchloride (PVC), polyamide (PA), polyester (PES), polyimide (PI), polycarbonate (PC), styrene acrilonitryl (SAN), acrylonitril-butadiene-styrene (ABS), thermoplastic polyurethane (TPU), thermoplastic polyolefins (TPO), thermoplastic copolyetheresters. Alternatively, natural or synthetic rubber may be used as a matrix, or the elongated metal elements may be embedded in a metal matrix, e.g. Al or Al-alloy or Cu or Cu-alloy or Zn or Zn-alloy.

Preferably, a chemical bond between elongated metal element and the matrix is provided.

A skilled man understands that a force-limiting energy absorber may further comprise other parts, e.g. an elongation delimiter (providing integrity to the force-limiting energy absorber and the system where it's used in when it has been loaded over its maximum load limit and limiting the maximum elongation imposed by the distance restrictions), a control part, denouncing that the force-limiting energy absorber has absorbed energy and fixing means to connect the force-limiting energy absorber to external bodies.

The working of a force-limiting energy absorber according to the invention in a car safety belt system is described hereinafter. During a car collision, the car is slowed down. Initially the driver and the passengers do not decelerate. So, they accelerate with respect to the car. This acceleration is to be prevented by the safety belt system, which limits the movement of the driver and the passengers with respect to the car. So the safety belt system imposes a certain deceleration, which restricts movements of the driver and the passengers with respect to the car. This force however must be limited. Too high a force from safety belt to the driver or the passengers may lead to serious injuries, e.g. bone fractures or internal bleeding. The forces imposed by the safety belt to the driver or the passenger are to be limited, which can be done by using a force-limiting energy absorber.

At a car collision, the very initial deceleration of the car does not form a problem. The initial deformations are at the level of the impact beam. This deceleration may be directly imposed upon the driver and any present passengers. As the deformation of the car progresses, the deceleration of the car increases. Therefor, the acceleration of the driver or the passengers with respect to the car, and the related force increase. The corresponding force, imposed by the safety belt to the driver or passenger in order to compensate such acceleration, would become too high. A controlled movement of the driver or the passengers must be allowed under maximum admissible force. This is done by means of a force-limiting energy absorber, absorbing energy in an irreversible way. The slowing down of the driver and the passengers is spread over a time range, which is as great as possible, taking into account, the working of other safety systems such as airbags, and distance restrictions.

By limiting the force in an irreversible way, the elastic spring back is also limited, which may decrease the likelihood for whiplash or other injuries.

In the present invention, the force imposed by the safety belt system to the driver or passengers is kept essentially constant by elongating the elongated metal element, e.g. the steel wire, in its plastic deformation region, possibly until fracture of the elongated metal element. In this way the elongated metal element, e.g. a steel wire, preferably has an irreversible, plastic elongation at fracture above 5%, e.g. above 7%. By obtaining such plastic elongation, the force-limiting energy absorber absorbs energy of the driver or passenger on the safety belt.

In numerous other applications of a force-limiting energy absorber as subject of the invention, energy of an object is absorbed in a similar way, causing plastic irreversible elongation of the elongated metal element of the force-limiting energy absorber. Such applications are e.g. anti-whiplash-devices and seats, safety belts, safety lines or tack of altitude workers, mooring applications of different objects, safety nets or safety trampolines.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
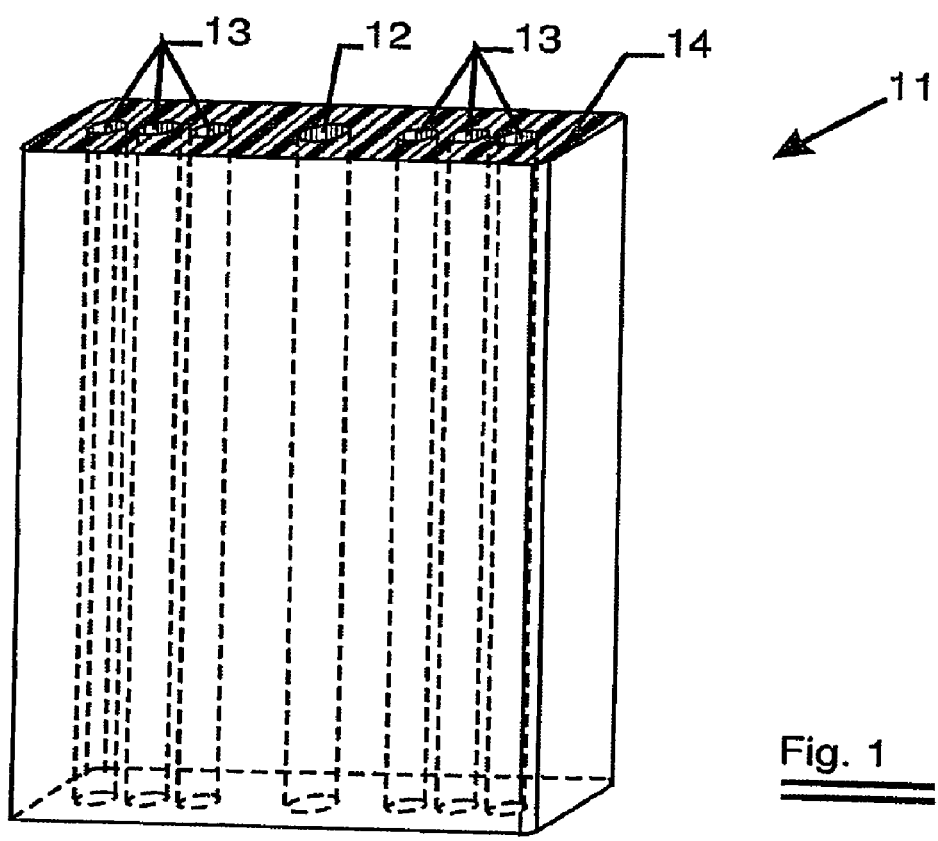
FIG. 1 is a schematically view of a force-limiting energy absorber as subject of the invention FIG. 2 gives load-elongation curves of a force-limiting energy absorber of FIG. 1, and of the wires used to provide this force-limiting energy absorber.

An embodiment of a force-limiting energy absorber 11 as subject of the invention is shown in FIG. 1. A first elongated metal element, being a steel wire 12, is provided having a diameter of 1.44 mm and being provided out of a steel alloy comprising 0.80%C, 0.40 to 0.70% Mn, 0.10 to 0.35% Si, a maximum S content of 0.04% and a maximum P content of 0.04%. The hard drawn steel wire has been subjected to a patenting treatment so that its elongation at fracture is at least 7%.

A second and additional elongated metal elements, being six other steel wires 13 are provided having a diameter of 1.46 mm, and being provided out of annealed low carbon steel, comprising less than 0.10%C, less than 0.6% Mn, less than 0.3% Si, a maximum S content of 0.035% and a maximum P content of 0.035%.

These 7 wires, essentially parallel to each other, are embedded in a synthetic rubber matrix 14. A chemical adhesion between wires and rubber matrix is obtained. This chemical adhesion may be improved by using appropriate coatings on the wire. In case of rubber, such coating is preferably a brass or bronze coating.

Figure 2:
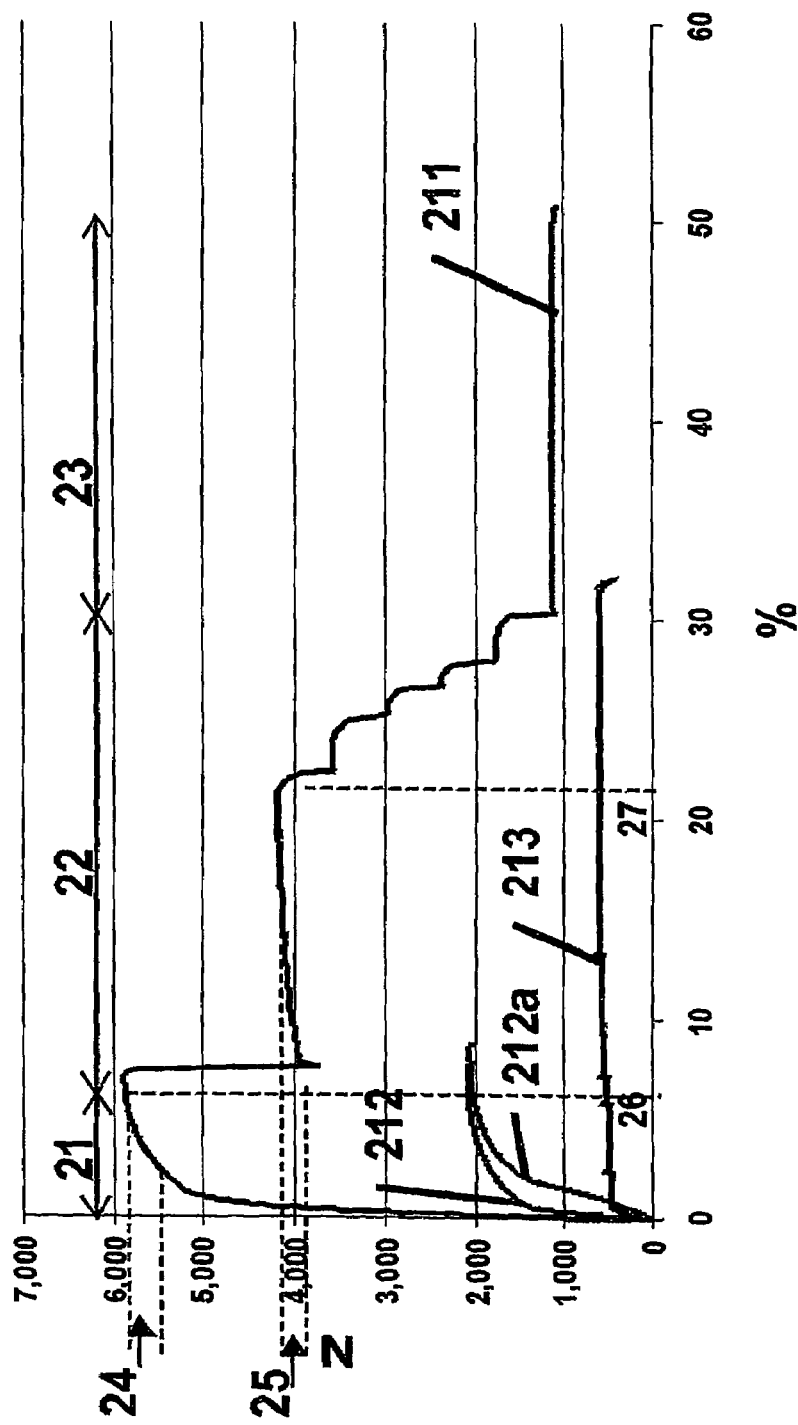

As shown in FIG. 2, when the force-limiting energy absorber 11 is subjected to an elongating action, the influence of both wires 12 and 13 are clear.

In a first phase 21 of the elongation action, the force (on the left scale expressed in Newton (N)) is greater than in a second phase 22, following the first phase 21. In the first phase 21, the higher carbon steel wire 12 reaches quite quickly its maximum force level 24 and remains there until a maximum elongation 26, for the present embodiment 7.8%. At the time a maximum elongation is reached, the high carbon steel wire is maximally deformed in its plastic deformation region of the load-elongation curve, and the higher carbon steel wire 12 breaks one or preferably more lower carbon steel wires 13 further absorb the remaining energy. The force executed by the force-limiting energy absorber comes down to a lower level 25, the sum of the breaking loads of the lower carbon steel wires 13. The force remains there more or less constant until the force-limiting energy absorber is elongated to a much higher elongation 27 of about 22% has been reached, a the end of their plastic deformation region. For the present embodiment, each wire 13 breaks one after an other. Possibly, some or all wires 13 break simultaneously, which may cause an even higher elongation 27. The third phase 23 is cause by the elongation and break of the rubber matrix.

It is clear that the shape of the load-elongation curve 211 of the force-limiting energy absorber 11, is defined by the properties of the wires 12 and 13. The load-elongation curves of wires 12 respectively 13 are shown in FIG. 2 as curve 212 respectively 213. The load elongation curves are measured with a gage length of 100 mm.

In case the increase of force is too high in the beginning of the curve, the wire 12 may be provided with one or more crimps, e.g. a sinusoidal crimp having a wavelength of 42 mm and amplitude of 2 mm. The load-elongation curve of such crimped wire is shown in FIG. 2 as curve 212a. The load-elongation curve of a force-limiting energy absorber comprising such crimped wire in stead of wire 12, further having the same properties as wire 12, reflects an identical change in the load-elongation curve of the force-limiting energy absorber.

Figure 3:
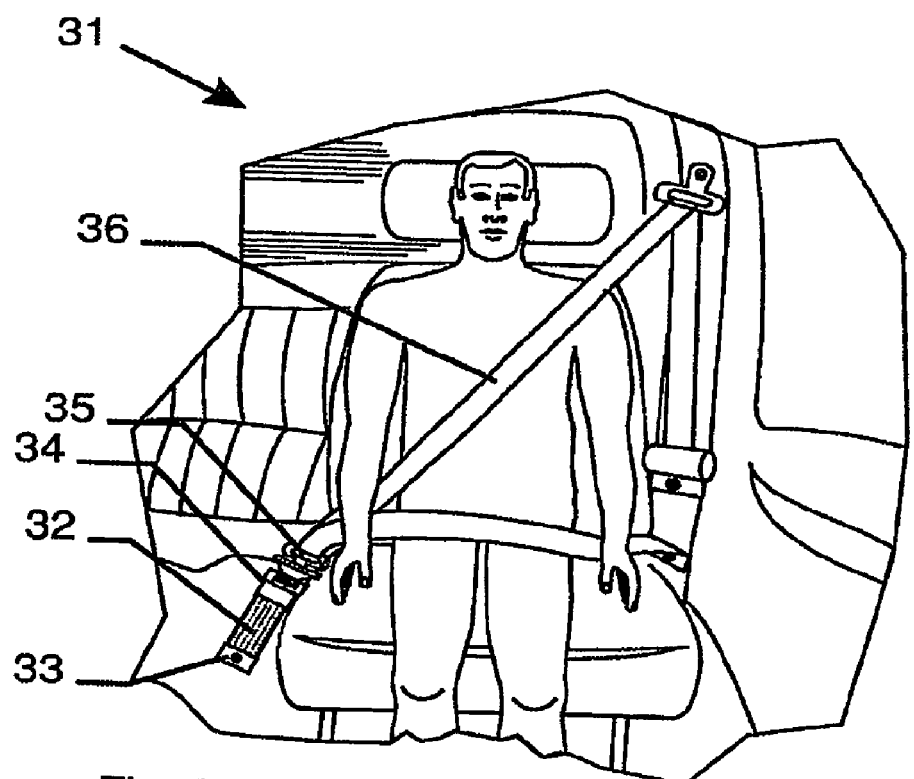
FIG. 3 and FIG. 4 show schematically a safety belt system comprising a force-limiting energy absorber.
Figure 4:
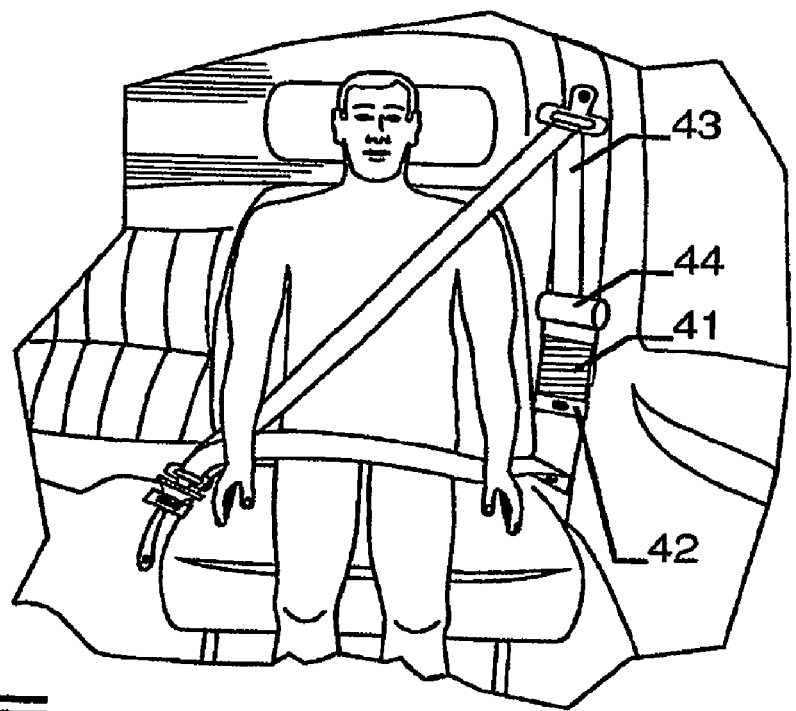

FIG. 3 shows the use of a force-limiting energy absorber 32 as subject of the invention in a safety belt system 31. The force-limiting energy absorber is mounted between the belt buckle 34 for the insertion of the tongue 35 of the belt 36 and the vehicle structure. Alternatively, as shown in FIG. 4, the force-limiting energy absorber 41 is mounted between the belt retractor 44 with belt 43, and the vehicle structure 42.

The invention claimed is:

1. A force-limiting energy absorber comprising:
   at least a first and a second elongated metal element, said elongated metal elements being chosen out of a group consisting of a metal wire, a profiled metal wire, a metal strand, a bundle of untwisted metal wires and a metal rope,
   wherein said elongated metal elements are deformable in a plastic region of load-elongation properties for absorbing energy,
   wherein said load-elongation properties and elongation at fracture of said first elongated metal element is different from said load-elongation properties and elongation at fracture of said second elongated metal element.

2. A force-limiting energy absorber according to claim 1, wherein said first and said second elongated metal elements have essentially the same length.

3. An energy absorber according to claim 1, wherein said first and second elongated metal elements are metal wires.

4. An energy absorber according to claim 1, wherein said first and said second elongated metal elements have an elongation at fracture of at least five percent.

5. An energy absorber according to claim 1, wherein said elongated metal elements are elongated steel elements.

6. An energy absorber according to claim 5, wherein said first elongated metal element has a carbon content below 0.20 percent and an elongation at fracture above 20 percent.

7. An energy absorber according to claim 5, wherein said second elongated metal element has a carbon content higher than 0.60 percent.

8. An energy absorber according to claim 1, wherein at least one of said elongated metal elements is provided with an undulated form.

9. An energy absorber according to claim 1, wherein said energy absorber further comprises additional elongated metal elements.

10. An energy absorber according to claim 9, wherein said additional elongated metal elements are identical to said first or said second elongated metal element.

11. An energy absorber according to claim 1, wherein said elongated metal elements are embedded in a matrix.

12. An energy absorber according to claim 11, wherein said matrix is a polymer matrix.

13. An energy absorber according to claim 11, wherein a chemical bond is provided between said elongated metal elements and said matrix.

14. A safety belt comprising one or more energy absorbers according to claim 1.

* * * * *